United States Patent
Butera et al.

(10) Patent No.: US 7,073,332 B2
(45) Date of Patent: Jul. 11, 2006

(54) STOP DEVICE WITH SHAPE MEMORY ACTUATOR

(75) Inventors: Francesco Butera, Turin (IT); Stefano Alacqua, Rivoli Cascine Vica (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 174 days.

(21) Appl. No.: 10/848,374

(22) Filed: May 19, 2004

(65) Prior Publication Data

US 2004/0231950 A1 Nov. 25, 2004

(30) Foreign Application Priority Data

May 20, 2003 (IT) .......................... TO2003A0366

(51) Int. Cl.
| | |
|---|---|
| B60R 19/24 | (2006.01) |
| B66C 1/66 | (2006.01) |
| E05B 47/00 | (2006.01) |
| F01B 29/10 | (2006.01) |
| F02G 1/04 | (2006.01) |
| F03G 7/06 | (2006.01) |
| F16B 1/00 | (2006.01) |
| F16K 31/00 | (2006.01) |
| F16L 37/12 | (2006.01) |
| F16P 3/00 | (2006.01) |

(52) U.S. Cl. .......................................... 60/527; 403/28
(58) Field of Classification Search .................. 60/527, 60/528; 403/28

See application file for complete search history.

(56) References Cited

U.S. PATENT DOCUMENTS

| | | | | |
|---|---|---|---|---|
| 4,559,512 A | * | 12/1985 | Yaeger et al. | 60/527 |
| 4,753,465 A | | 6/1988 | Dalby | |
| 4,829,843 A | * | 5/1989 | Suzuki | 60/527 |
| 4,944,169 A | | 7/1990 | Labelle et al. | |
| 5,722,709 A | * | 3/1998 | Lortz et al. | 60/527 |
| 6,008,992 A | | 12/1999 | Kawakami | |
| 6,404,098 B1 | * | 6/2002 | Kayama et al. | 310/307 |
| 6,450,725 B1 | * | 9/2002 | Roth et al. | 403/28 |
| 6,732,516 B1 | * | 5/2004 | Butera et al. | 60/527 |
| 6,762,669 B1 | * | 7/2004 | Alacqua et al. | 60/528 |
| 6,851,260 B1 | * | 2/2005 | Mernøe | 60/527 |
| 2004/0035108 A1 | * | 2/2004 | Szilagyi | 60/528 |
| 2005/0183479 A1 | * | 8/2005 | Alacqua et al. | 70/277 |

FOREIGN PATENT DOCUMENTS

| | | |
|---|---|---|
| DE | 2 140 554 A | 2/1973 |
| DE | 195 29 712 A1 | 2/1997 |
| FR | 2 820 174 A1 | 8/2002 |
| WO | WO 01/79107 A1 | 10/2001 |

\* cited by examiner

*Primary Examiner*—Sheldon J Richter
(74) *Attorney, Agent, or Firm*—Sughrue Mion, PLLC

(57) ABSTRACT

A stop device with a shape memory actuator includes two stop elements sliding within a fixed support structure and usually hold in their mutual distant position by cam means pushed through spring means. A shape memory actuator is started through an electric current passage for causing the displacement of the cam means in a position wherein they permit the backward movement of the two stop elements towards a mutual close position.

10 Claims, 3 Drawing Sheets

STOP DEVICE WITH SHAPE MEMORY ACTUATOR

BACKGROUND OF THE INVENTION

The present invention refers to a stop device usable in any application wherein it is necessary to arrange a deactivable stop device for avoiding the movement, at least in one direction, of a first moving structure with respect to a second structure.

SUMMARY OF THE INVENTION

The object of the invention is to carry out a stop device which shows a simple structure, with reduced hindrance, economical to produce and at the same time is effective in the functioning.

In view of attaining this purpose, the object of the invention is a stop device having the features defined in the enclosed claim 1. Further advantageous features of the invention are defined in the remaining dependent claims.

DETAILED DESCRIPTION OF THE DRAWINGS

The invention will be now described with reference to the enclosed drawings, which are given as not limitative example, wherein.

DETAILED DESCRIPTION OF THE INVENTION

With reference to the drawings, numeral 1 generally shows a fixed support structure comprising a box shaped body of a metal sheet 2 with two end flanges 3, 4 for allowing the mounting of the structure 1 on any structure which is designed to receive the same.

Figure 3:
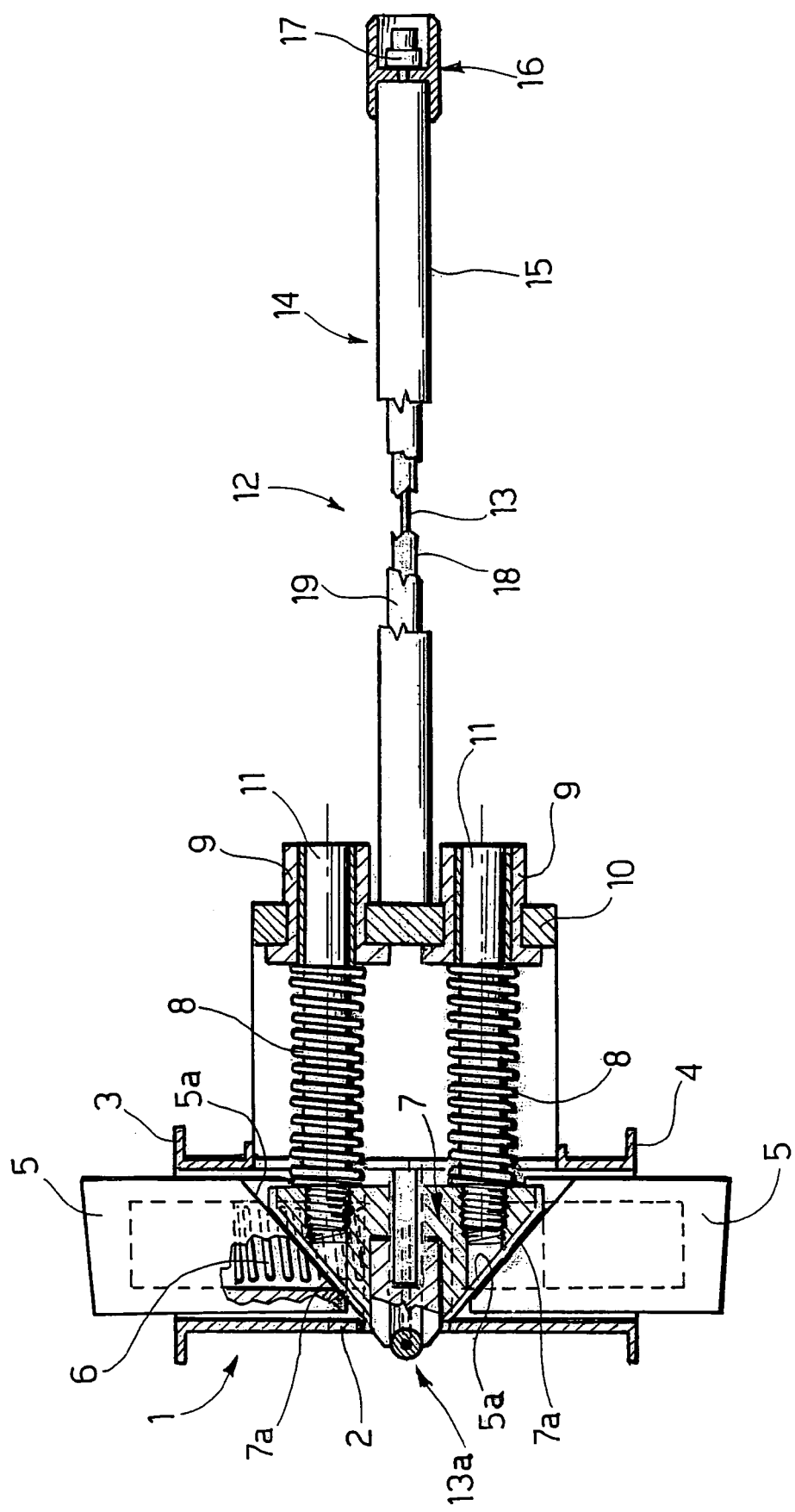
FIG. 3 is a sectional view of the device of FIGS. 1, 2.

Within the box shaped body 2, two stop elements 5 are slidably mounted, which are movable between a mutual distant position, that can be seen in FIG. 3, and a mutual close position. In the aforesaid mutual distant position that can be seen in FIG. 3, the two stop elements 5 are designed to co-operate with a stop surface (not shown) arranged over a structure, at which respect the structure carrying the device according to the invention is movable, in order to determine a stop position of a structure with respect to the other. In the description and in the enclosed drawings, these structures mutually movable therebetween are not shown, as the device forming the object of the invention is of a general application.

By mere way of example, the stop device-carrying structure can be a retractable bumper of a motor vehicle.

Figure 1:
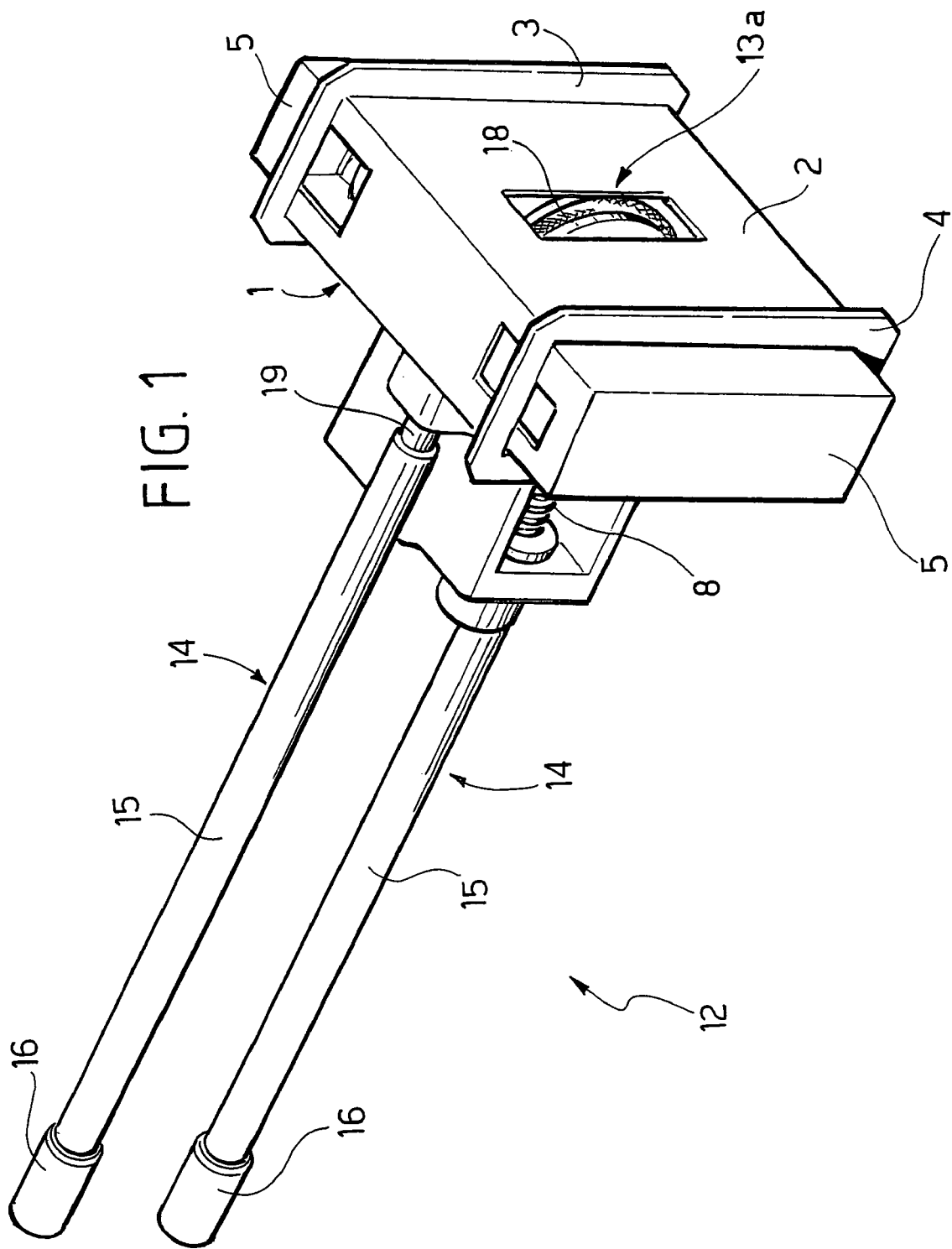
FIG. 1 is a perspective view of a stop device according to the invention.
Figure 2:
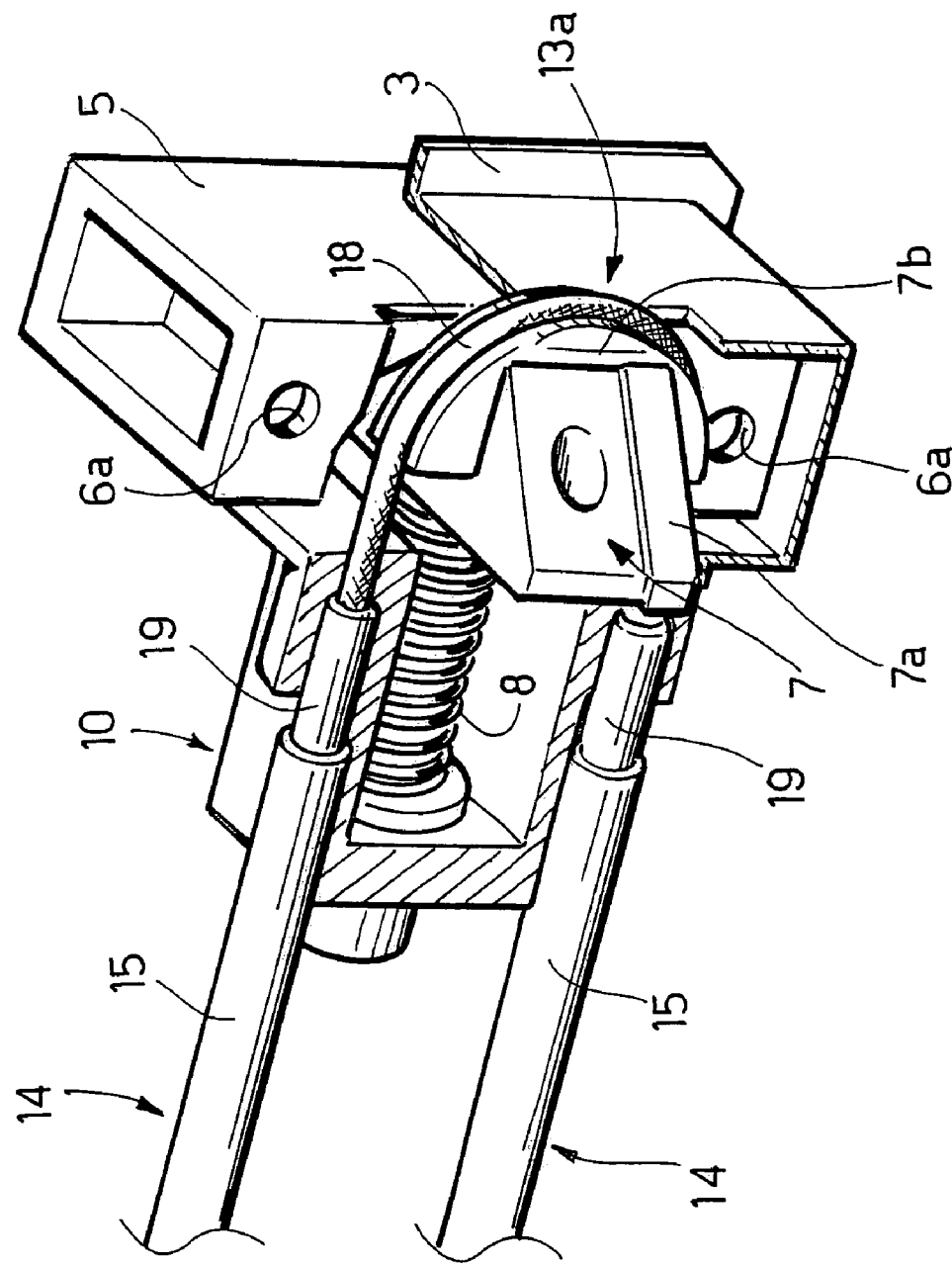
FIG. 2 is a partially sectioned view of the device of FIG. 1.

At each of the stop elements 5 a first and a second coil springs 6 are associated (one of which is partially visible in FIG. 3), which are arranged according to the hole axes 6a of the stop element 5 that can be seen in FIG. 2. Coils 6 are arranged for operating under traction in order to tend to maintain the two stop elements 5 towards their mutual close position.

As it is clearly evident in FIG. 3, the two stop elements 5 have two slanted surfaces 5a facing each other, substantially V-shaped, which co-operate with the two opposite slanted sides 7a of a wedge-shaped element 7, acting as a cam, which is pushed by two coil springs 8 leftwards (with reference to FIG. 3) in order to hold the two stop elements 5 in their mutual distant position, against the action of the springs 6. The wedge-shaped element 7 then acts as a cam which makes the two stop elements 5 move out from the box body 2 due to the engagement of the opposite inclined planes 7a, 5a.

Still with reference to FIG. 3, the movement of the wedge-shaped element 7 is driven within two bushings 9 fixed to a bracket 10 belonging to the fixed support structure 1, within which two cylindrical pins 11 are slidably mounted and fixed at one end to the wedge-shaped element 7.

In order to return the two stop elements 5 towards their mutual close position, a shape memory actuator, generally referred with the numeral 12, is arranged, which in the illustrated example includes a shape memory wire 13 arranged according to a general U-shaped configuration, with two branches 14 substantially parallel, and an intermediate joining portion 13a engaged around a curved groove of a guide element 7b fixed to the wedge-shaped element 7 (see FIG. 2).

The two opposite and adjacent ends of the shape memory wire 13 are rigidly connected with the fixed support structure 1. This is obtained by using two metal rigid tubes 15, each having one end fixed to the bracket 10 with the opposite end having a metal bushing 16 with a H-shaped section, within which a block 17, fixed to the respective end of the flexible cable 13, is mounted.

The cable 13 is formed by extrusion of a shape memory metal alloy. By applying a co-extrusion method, along with the cable 13, a synthetic material coating 18 is obtained, like the one which is the object of the previous patent application (still confidential) of the Applicant No. TO2003A000045. The function of this coating will result apparent in the following. The whole of the wire 13 with its co-extruded sheath 18 is arranged through a sheath 19 (FIG. 2) which has one end fixed to the bracket 10 as well, and the opposite end ending against the cross sector of the bushing 16.

Means (not illustrated) for supplying an electric current through the wire 13 are also provided. As a result of the electric current passage, the wire 13 becomes warm and, due to the shape memory, it undergoes a length reduction. Since the two opposite ends of the wire are fixed to the bushings 16, which are rigidly connected to the fixed support structure 1, the shortening of the wire causes a displacement of the intermediate joining portion 13a of the wire in the direction of the two adjacent ends of the wire, namely a displacement of the wedge-shaped element 7 (see FIG. 3) rightwards (always referring to FIG. 3), against the action of the springs 8. This shifting of the wedge-shaped element 7 causes consequently a displacement of the two stop elements 5 towards their mutual close position due to the springs 6 action, which is no longer opposed from the wedge-shaped element 7. In this condition, the stop device is then deactivated. When the current supply ends, the wedge-shaped element 7 is brought back in its starting position, as illustrated in FIG. 3, through the springs 8, whereby the wedge-shaped element 7 pushes the two stop elements 5 in their drawn active position. The advantage of using the coating 18 co-extruded with the shape memory wire 13 is, on one hand, to accelerate the wire cooling after the current interruption, and on the other hand to act as a kind of spring arranged throughout the wire length, in order to further increase the coming back of the wire to the quiescent condition when the current feed ends.

Obviously, without prejudice for the principle of the invention, construction details and embodiments could widely vary with respect to what has been described and shown by mere way of example, however without leaving the scope of the present invention.

For example, instead of one single U-shaped wire, two wires, e.g. in parallel, could be used, as well as one single wire corresponding to only one of the two wire branches illustrated herein. Moreover, the shape memory element could also be a rigid elengated element.

What is claimed is:

1. Stop device, comprising:
   a fixed support structure,
   a pair of stop elements slidably mounted within the support structure and movable among a mutual close position and a mutual distant position, wherein they protrude from the opposite sides of the fixed structure for co-operating with a corresponding stop surface,
   first spring means tending to return the two stop elements to their mutual close position,
   cam means for pushing the two stop elements towards their mutual distant position, against the action of said first spring means,
   second spring means for pushing the two stop elements towards a position wherein they hold the two stop elements in their mutual distant position, and
   a shape memory actuator for returning said cam means, against the action of said second spring means, towards a position wherein the two stop elements can freely move in their mutual close position, under the action of said first spring means.

2. Device according to claim 1, wherein the aforesaid cam means consist of one wedge-shaped element having two slanted opposite V-shaped sides co-operating with slanted surfaces facing each other of the two stop elements.

3. Stop device according to claim 2, wherein said wedge-shaped element is provided with a portion with a semi-circumferential groove for the engagement of said shape memory wire.

4. Device according to claim 2, wherein the slanted opposite sides of the wedge-shaped element are V-shaped in an orthogonal plane with respect to the plane defined by the two parallel branches of the shape memory wire.

5. Stop device according to claim 1, wherein said actuator includes at least one or more shape memory wires interposed among the fixed support structure and said cam means, and means for supplying an electric current through the aforesaid shape memory wires, in order to cause the heating and the consequent shortening due to the shape memory effect, thus causing a displacement of the aforesaid cam means towards a position where they allow the backward movement of the two stop elements towards their mutual close position.

6. Device according to claim 5, wherein it includes two wires arranged in parallel between a fixed structure and cam means.

7. Device according to claim 6, wherein the two wires are defined by two branches of one single wire U-returned around said cam means.

8. Device according to claim 7, wherein the aforesaid shape memory wire is obtained by extrusion along with a synthetic material coating.

9. Device according to claim 8, wherein the opposite adjacent ends of the shape memory wire are secured to two bushings, both fixed to the end of a metal tube fastened to the support structure.

10. Device according to claim 9, wherein within said metal tube a sheath is arranged, which is crossed by the aforesaid shape memory wire with the relative co-extruded coating.

* * * * *